Nov. 27, 1956 U. NISTRI 2,771,815
RECTIFIER FOR AIR PHOTOGRAPHS WITH NADIR
DISTANCE KNOWN AS TO DIRECTION OR SIZE
Filed June 1, 1953

INVENTOR

UMBERTO NISTRI

BY Bertram Ottinger

ATTORNEY

United States Patent Office 2,771,815
Patented Nov. 27, 1956

2,771,815

RECTIFIER FOR AIR PHOTOGRAPHS WITH NADIR DISTANCE KNOWN AS TO DIRECTION OR SIZE

Umberto Nistri, Rome, Italy

Application June 1, 1953, Serial No. 358,897

Claims priority, application Italy June 20, 1952

4 Claims. (Cl. 88—24)

When the nadir distance is known in planimetric air photographs, it is possible to receive rectified photograms or in other words photograms rendered similar to the corresponding photographs of the terrain made with the plane of the photograph horizontal.

These photograms serve to make radial nadir point triangulations by means of the measurement of the angles leaving the nadir point, by the use of radial stereocomparators or other similar means.

They can also serve to make photographic mosaics, uniting successive photographs of a series according to the rule that is based on the geometric properties of nadir points; in other terms, by making a radial graphic triangulation.

The object of the present invention is to facilitate the said operations of rectification by means of a new rectifier which is simple and practical to use, suitable for photograms which do not have a large nadir distance and on which the nadir point has been previously recorded by means of suitable devices and particularly those envisaged in Italian Patent No. 449,440 and in the application No. (R. V. 60/62) of June 20, 1952.

Figure 2:
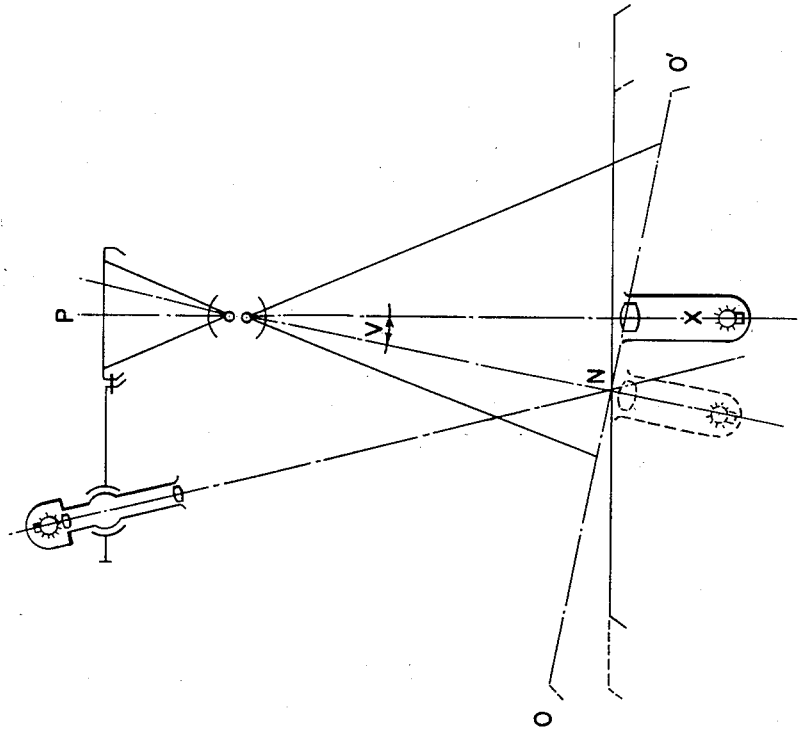
Figure 1:
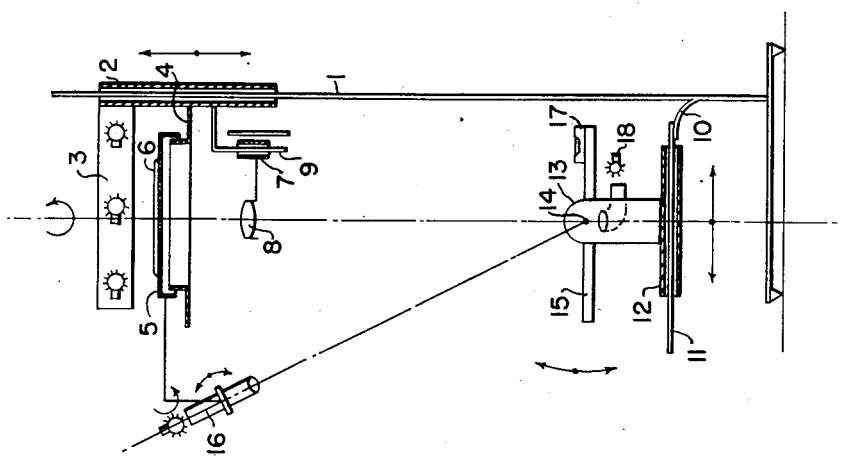

Referring now in detail to the drawings in which is shown one of the various possible embodiments of my invention, Fig. 1 is a vertical partly sectional view through an instrument constructed in accordance with my invention; and Fig. 2 is a schematic top plan view of said instrument.

The instrument consists (Fig. 1) of a vertical column 1 which supports the slide 2 which can slide along said column without rotating. At the top of said slide 2 is mounted a stirrup 3 which carries the system for illuminating the photogram and a horizontal plane 4 on which is located the support 5 for the photograph 6. This support 5 is of circular form and can rotate around its own center.

At the lower end of slide 2 there is a second stirrup 7 on which is located a lens 8, the optical center of which is arranged for rectification along a straight line at right angles to the plane of the photograph carrying frame 6, passing through its center of rotation. The system as thus composed, forms a camera to project photographs having a known internal orientation.

Stirrup 7 which carries lens 8 can move along support 9 maintaining the rectification condition, and said movements are measurable by means of graduations. This movement serves to impose on the projecting camera the principal distance of the taking camera. The whole system supported by slide 2 can be slid along column 1 and its movements are measurable by means of graduations.

On the lower part of column 1 and fixed solidly to it, there is a second stirrup 10 which supports a horizontal guide 11 arranged unvaryingly in relation to column 1.

On guide 11 slides a carriage 12 which supports a U-type stirrup with arms 13 arranged vertically.

The two arms 13 of the U support a horizontal shaft 14 which is at right angles to guide 11, which forms part of a frame of rectangular form 15 which constitutes the plane on which the image from the camera is projected.

The plane of frame 15 is arranged in such a manner that the line connecting the two centers of rotation of shaft 14 lines on said plane so that, when the frame rotates, this horizontal line remains immovable and at right angles to guide 11. This line is traced on the plane of the frame 15 together with another line at right angles, which passes through the center of the plane of the frame itself. These lines form a system of plane coordinates, the center of which is the center of the frame.

The edges of the frame are strictly parallel, for rectification, to said lines, and serve for tracing parallel to the two lines marked on said frame by means of a suitable T-square.

A collimator 16 is arranged on the support 5 of the photogram carrier 6, said collimator projecting a grid on the plane of frame 15. This collimator, by means of a special support regulated by micrometric screws, can vary the orientation of its own axis with the object of moving in any direction desired the image of the grid projected on the plane of the frame.

Also arranged on frame 15 is a level 17 of the air bubble type, located at right angles to the axis of rotation. This level serves to set the plane of the frame horizontal.

On the stirrup which supports lens 8, and outside said lens, is arranged a reference formed of a reference line engraved on a finely ground glass. This reference line is horizontal and passes through the projecting lens emergence node, and, by rectification, is parallel to the axis of rotation of frame 15.

Lastly, fixed solidly to frame 15 in line with its axis of rotation, is arranged a collimator 18, the collimating axis of which passes through the axis of rotation of the frame and is at right angles to the plane of said frame.

The operation of the instrument is the following:

Frame 15 is arranged horizontally by means of level 15.

The photogram is centered on the photogram carrier so that its principal point is projected exactly to the center of the orthogonal system existing on the plane of the frame.

The principal distance of the projecting camera is equal to that of the taking camera.

Support 5 of the photographs is then rotated on its plane so that the axis of the internal orientation of the photogram are brought in position to coincide with the corresponding lines traced on the frame of projection 15.

When the position of the nadir point does not appear on the photogram, the position must be determined on the projected image by means of the references recorded by suitable instruments, as envisaged in application No. (R. V. 60/62) and in other known ways.

Having done the above, the grid of the collimator 16 which is fixed solidly to the photogram carrier, is caused to coincide with said nadir point, by the use of the micrometric screws on the collimator support, but without rotating the photogram carrier. The nadir point is thus rendered clearly visible. The support 5 of the photogram carrier 6 is then again rotated in order to bring the center of said grid on the longitudinal axis of the plane of projection or, in other words, on the line at right angles to the axis of rotation 14 of frame 15 which figures in the plane of said frame.

This having been done, the axis of rotation 14 of frame 15 finds itself arranged at right angles to the vertical plane which contains the maximum inclination of the photogram or, in other words, at right angles to the plane which will contain the line vertical to the point of taking and the principal axis of the camera.

Frame 15 is then moved horizontally along axis 11 by the use of guide 10, until the point of intersection of the two axes traced on the plane of the frame are caused to coincide with the center of the grid of collimator 16.

Rotating the plane of frame 15 around axis 14, the center of the grid of collimator 18, the direction of which is at right angles to the plane of the frame, is caused to coincide with the refeernce line which passes through the center of projection of the photograph, or 2nd node of lens 8.

When these operations have been effected, the plane of the frame, on which projection takes place, is rendered at right angles to the vertical line passing through the photogram taking point—in other words to the line uniting the 2nd node of the camera lens with the image of the nadir point of the photogram on the plane of projection. (It is obvious that on the instrument, instead of as happens in reality, the photograph always remains horizontal and therefore the nadir axis will be inclined by the nadir distance.)

A sheet of sensitive paper is then placed on the plane of frame 15 and a reproduction is made of the photograph projected on said plane, taking care to record on the photograph, at the same time, the grid of collimator 16 which forms the image of the nadir point on the rectified photograph with the approximation of the regulating instruments of the taking camera.

Said image of the nadir point will allow radial triangulation to be made.

Fig. 2 shows the trace $oo'$ (line and point) of the plane of the frame after it has been rotated around the horizontal axis in order to bring the collimator into the direction of the taking point. Said Fig. 2 is merely the outline of the principle of the rectifier.

What I claim is:

1. An apparatus for rectifying air photograms having an identifiable nadir point position, said apparatus comprising, a frame for holding an unrectified photogram, means mounting said frame for rotation about a central axis perpendicular thereto, an optical system to project light through said frame, said system including a lens, a second frame for holding a sensitized sheet on which the rectified photogram is printed, a collimator, and means mounting said collimator on said first frame, said collimator including an optical system and a grid and being arranged to project the image of said grid onto the second frame independently of the projection of the unrectified photogram onto said second frame.

2. An apparatus as set forth in claim 1 wherein the collimator mounting means includes means permitting rotation of the collimator about two axes perpendicular to one another and to the optical axis of the collimator.

3. An apparatus for rectifying air photograms having an identifiable nadir point position, said apparatus comprising a frame for holding an unrectified photogram, means mounting said frame for rotation about a central axis perpendicular thereto, an optical system to project light through said frame, said system including a lens, a second frame for holding a sensitized sheet on which the rectified photogram is printed, means mounting the second frame for oscillatory movement about an axis lying in said frame, means mounting said frame for translatory movement in a direction perpendicular to the optical axis of the optical system and perpendicular to the axis of oscillation, a member associated with the lens, said member having a reference line perpendicular to the optical axis and in line with said lens, said line being parallel to the plane of the first frame and to a shaft around which the second frame is rotatable, and a collimator, said collimator being mounted on said second frame and having an optical system, the optical axis of which is perpendicular to the plane of the frame and passes through the axis of oscillation.

4. An apparatus as set forth in claim 3 wherein a second collimator is provided, said second collimator being mounted on the first frame and including an optical system and grid and being arranged to project the image of said grid onto said second frame independently of the projection of the unrectified photogram onto said second frame.

References Cited in the file of this patent

UNITED STATES PATENTS

| | | |
|---|---|---|
| 1,410,127 | Roussilhe | Mar. 21, 1922 |
| 1,528,021 | Janzer | Mar. 3, 1925 |
| 1,652,271 | Cooke | Dec. 13, 1927 |
| 1,713,498 | Cooke | May 14, 1929 |